United States Patent [19]

Malmsten

[11] 4,236,903
[45] Dec. 2, 1980

[54] AIR CLEANER

[76] Inventor: Sven O. Malmsten, Raberga, Vintrosa, Sweden, S-71015

[21] Appl. No.: 925,529

[22] Filed: Jul. 17, 1978

[51] Int. Cl.³ .............................................. B01D 50/00
[52] U.S. Cl. ........................................ 55/325; 55/308;
  55/336; 55/463; 55/446
[58] Field of Search ................... 55/308, 330, 336, 463,
  55/485, 486, 321, 324, 325

[56] References Cited

U.S. PATENT DOCUMENTS

| | | | |
|---|---|---|---|
| 1,922,688 | 8/1933 | Kamrath | 55/330 |
| 1,949,212 | 2/1934 | Lowther | 55/485 |
| 3,499,270 | 3/1970 | Paugh | 55/485 |
| 3,923,483 | 12/1975 | Hilmer et al. | 55/463 |

Primary Examiner—Norman Yudkoff
Attorney, Agent, or Firm—Holman & Stern

[57] ABSTRACT

A air cleaner, comprising a container through which an elongated inlet tube is arranged to pass through a separating means in the form of piled discs having passages between them, said inlet tube being arranged with an outlet opening inside the container, said container being divided by a perforated partition into an air chamber for contaminated air and a substance chamber, said partition serving as a primary separation means arranged to permit flow of substance or contaminant into the substance chamber under influence of pressure from the contaminated air within the air chamber, said air thereafter being passed through said passages between the discs and leaving the container at the top.

3 Claims, 2 Drawing Figures

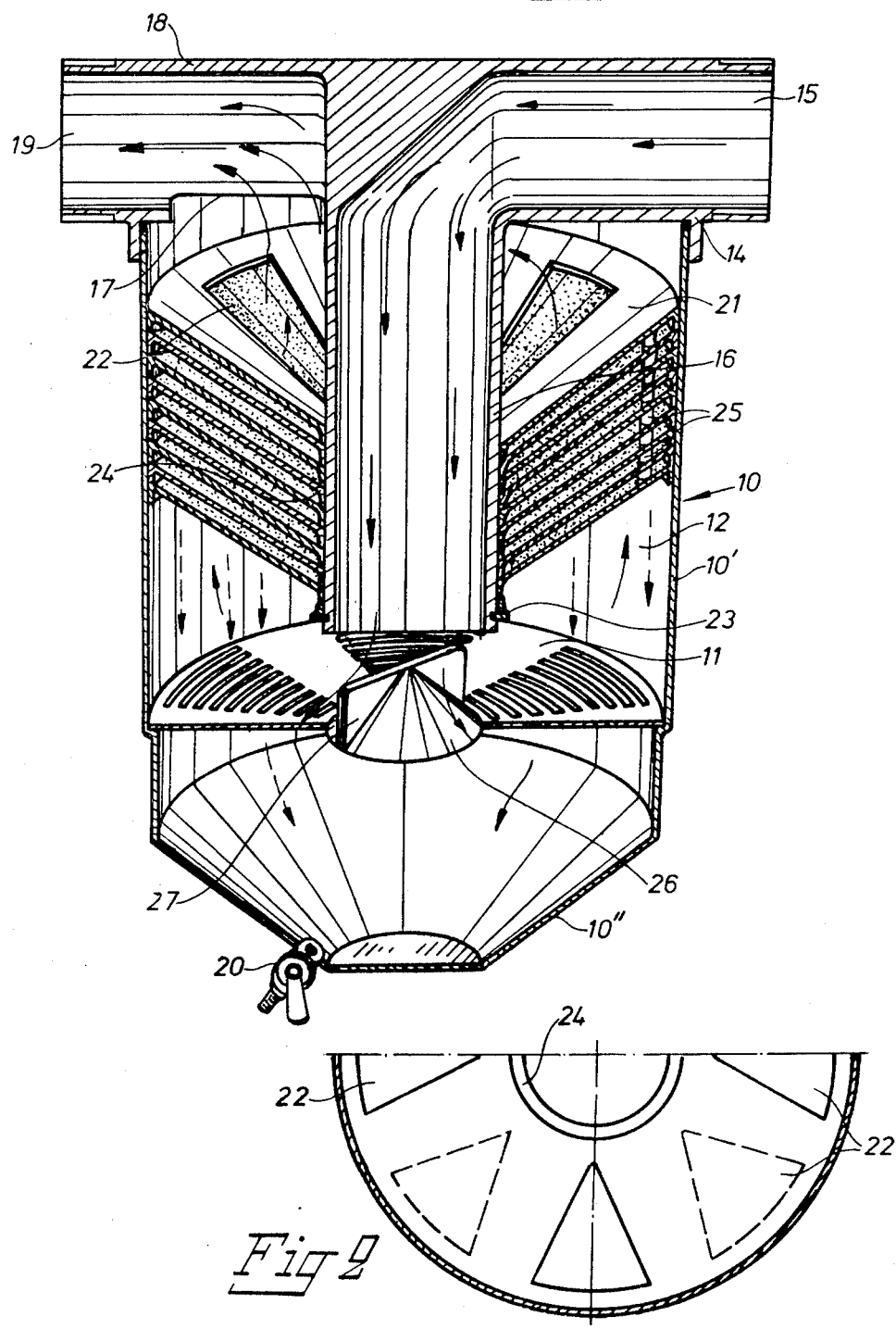

AIR CLEANER

The present application relates to an air cleaner intended for separating air from particles or contaminants, mixed into the air, having greater density than the air, and for leading away the cleaned air.

In such apparatus as for example milking machines, by which a rotary pump, which is lubricated with a suitable oil, produces the vacuum needed for the milking process and by which the air is vented after having been used, this air is mixed or contaminated with said lubricating oil. Consequently the air should be cleaned before being let out into the surrounding atmosphere. This is because other environmental problems will occur, especially as contamination of the subsoil water during several years of discharge as well as in densely built-up areas, which may have similar machines, can be considerable.

A number of different constructions of air cleaners for the above mentioned purpose are previously known. However, for a number of reasons these previously known air cleaners have not shown themselves to satisfy the necessary requirements with regard to effectiveness of the cleaning of the discharged air. The known air cleaners are provided with filtering means, in which the heavier substances are meant to be absorbed and later on these substances are removed together with the filtering means since the filtering means have to be exchanged with new ones after some time. In practice this work is not done until the filtering means are so saturated by said substances that the discharged air is not cleaned at all, which means that the air cleaners from time to time are not operating properly.

There are also known air cleaners which include a vessel in which a number of discs are inserted in order to form passages through which the air is passed. The contaminants will adhere to the surfaces of the discs and will run from the discs and fall to the bottom of the vessel while the cleaned air is passed out through the top of the vessel.

An object of the invention is to improve the separating effect of air cleaners having discs.

A second object of the invention is to make it possible to clean the discs without disconnecting the cleaner from the piping which it serves.

The air cleaner according to the present invention comprises a container, in which separating means are provided for separating said air and said contaminants from each other, whereby the container is provided with one opening for discharge of completely or partially cleaned air after passage of the air through the separating means, whereby centrally in the container is arranged an elongated inlet tube, which passes through said separating means and has an outlet opening inside the container and which is arranged to be connected to said discharge outlet, and that the container is divided by means of a perforated partition into, on one side, an air chamber for contaminated air and, on the other side, a substance chamber, whereby the arrangement is such that the substance or contaminant(s) will undergo a primary separation at said partition and flow down into the substance chamber, under the influence of pressure from the contaminated air within the air chamber.

The air cleaner is characterized in that said separating means comprises a number of funnel-shaped discs, which are piled above each other with a gap between and which are provided with a number of openings for the passage of partially cleaned air, said openings of one disc being out of the line with corresponding openings of adjacent discs.

An embodiment of the present invention is more fully described below with reference to the accompanying drawing.

FIG. 1 is an elevational perspective side view of the embodiment, partially in section, having arrows drawn in continuous lines indicating the completely or partially cleaned air and arrows drawn in broken lines indicating the air contaminating substances, such as oil for example.

FIG. 2 is a plan view of a part of one of the separating means.

The container is generally shown by 10 as an elongated container which can be mounted vertically and be connected to a pipe being passed by air which is contaminated with substances or particles of a substance. The container 10 is preferably made of sheet-metal or plastic material, and the cross-section of same is preferably circular with an open upper end. At its lower end portion 10″ the container 10 is funnel-shaped and provided with an outlet, while the rest of the container 10 has a cylindrical form. In the transition between the cylindrical part 10′ of the container and the conical part 10″ of the container, it is arranged and rigidly held a perforated disc 11 in the container, which is placed in the transverse direction of the container in such a way that it divides the container into two chambers, one of which will be referred to as air chamber 12 and is situated at the cylindrical part, while the other will be referred to as substance chamber 13 and is situated at the conical part.

The container 10 has a cap 14 covering its upper end which is open. The cap has an inlet 15 in the form of a pipe part. The pipe part 15 leads to a vertical tube 16, which is placed in the centre axis of the container 10. The tube 16 has its mouth at a small distance above the disc 11. The cap 14 has also a hole 17 to which a second pipe part 18 is connected. This pipe part 18 forms the outlet 19 for the cleaned air. The cap 14 is fastened by suitable means to the container 10, so that the connection between the cap and the container is air-tight.

The conical part 10″ of the container 10 at its bottom part is provided with a controllable outlet valve 20, to which a tube can be connected for discharge of oil or other possible contaminants.

The separating means for final separating of the air and the substances are comprised of a number of funnel-shaped and circular, relatively thin, discs 21 made of sheet-metal or plastic. Each disc 21 is provided with a number of triangular openings 22, which are arranged at equal distance from each other. Each disc 21, at its circular inner edge has a vertically and downwards pointing support flange 24. The support flanges abut on the tube 16. Each disc 21 at its outer edge portion is provided with a number of studs 25 which are directed downwards and rest on the upper surface of an underlaying disc. The inner side of the support flange 24 of each of the funnel-shaped discs 21 is intended to rest against the outer side of the centre tube 16, while the outer edge of the discs 21 are arranged to span against the inner side of the cylindrical part 10′ of the container 10. The discs 21 are fitted into a pile on the tube 16 and the surfaces of the discs are directed obliquely upwards from the tube 16. A retaining ring 23 on the end of the tube 16 prevents the discs from slipping off the tube. The discs are arranged above each other in such a way that the openings 22 in every other disc are not brought in front of each other.

As already explained the perforated disc 11 is placed under the mouth of the centre tube 16. The disc 11 has a conically formed upstanding part 26 in its centre. This part has a wing 27, which devides the conical part in two identical parts. The width of the base of the conical part 26 as well as the length of the wing 27 correspond to the diameter of the centre tube 16. The wing 27 and the conical part 26 direct the air stream along the upper surface of the perforated disc 11.

The air cleaner according to the invention works in the following manner:

When air, which is contaminated with e.g. particles of a lubricant as oil, is introduced by pressure through the inlet 15, the air is then forced through the centre tube 16 into the air chamber 12. The greater part of the oil, having greater density than air, is hereby directed towards the perforated disc 11, whereby said oil is separated from the air and will run or drip down through the holes in the disc 11 to the substance chamber 13. The partially cleaned air in the air chamber 12, being pressurized, is then forced through the openings 22 of the discs 21 and the gaps between the disc and further on through the hole 17 and out through the outlet 19. The remaining part of the oil, i.e. that part of the oil which is transported together with the pressurized air in between the discs 21, runs down along their surfaces and openings 22, to the perforated disc 11 and through it, when the air in the air chamber is not pressurized. In this way the discs 21 are cleaned automatically. If a tube is connected to the outlet valve 20 the oil can be lead into a receptacle for later reuse.

The air cleaner according to the present invention is fairly umcomplicated and is inexpensive to produce. Furthermore, it satisfies all requirements as to efficient air cleaning, as described above.

Within the frame of the scope of the present invention and the following patent claims, the air cleaner can be modified in a number of ways.

I claim:

1. An air cleaner for the removal of contaminants in a flow of contaminated air through said air cleaner, said air cleaner comprising:
    a container having an elongated centrally located inlet tube and an outlet opening, said contaminated air flowing into said inlet tube and clean air flowing out of said outlet opening;
    dividing means for dividing said container into air and substance chambers, said air chamber for containing said contaminated air and said substance chamber for containing contaminants removed from said air, said dividing means comprising a plate with a plurality of arcuate perforations extending radially thereon and a conical portion located thereon so that said contaminated air flows from said inlet tube onto the apex of said conical portion; and
    separating means for removing said contaminants from said contaminated air, said separating means comprising a plurality of funnel-shaped discs located in said air chamber and coaxially around said inlet tube, each of said discs having means defining openings therethrough, said means defining openings being non-aligned with adjacent discs.

2. An air cleaner for the removal of contaminants in a flow of contaminated air through said air cleaner, said air cleaner comprising:
    a container having an elongated centrally located inlet tube and an outlet opening, said contaminated air flowing into said inlet tube and clean air flowing out of said outlet opening;
    dividing means for dividing said container into air and substance chambers, said air chamber for containing said contaminated air and said substance chamber for containing contaminants removed from said air, said dividing means comprising a perforated partition with a conical portion located thereon and a wing on said conical portion having a plane in the center of the conical portion, with said contaminated air flowing from said inlet tube onto the apex of said conical portion; and
    separating means for removing said contaminants from said contaminated air, said separating means comprising a plurality of funnel-shaped discs located in said air chamber and coaxially around said inlet tube, each of said discs having means defining openings therethrough, said means defining openings being non-aligned with adjacent discs.

3. Air cleaner according to claim 2, characterized in that the width of the base of said conical portion and the length of the wing correspond to the diamater of said elongated inlet tube.

* * * * *